(12) United States Patent
Pollard et al.

(10) Patent No.: US 7,023,483 B2
(45) Date of Patent: Apr. 4, 2006

(54) FRAMING AID FOR A DOCUMENT CAPTURE DEVICE

(75) Inventors: Stephen Bernard Pollard, Nr. Dursley (GB); Maurizio Pilu, Bristol (GB); Andrew C. Goris, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 980 days.

(21) Appl. No.: 09/749,458

(22) Filed: Dec. 28, 2000

(65) Prior Publication Data

US 2001/0016084 A1 Aug. 23, 2001

(30) Foreign Application Priority Data

Feb. 21, 2000 (EP) ................... 00301350

(51) Int. Cl.
*H04N 5/232* (2006.01)
*H04N 5/225* (2006.01)

(52) U.S. Cl. .................. 348/351; 348/141; 348/370

(58) Field of Classification Search ............... 348/263, 348/264, 370, 373, 239, 317, 333.03, 87, 348/86, 136, 141, 143, 345, 68, 552, 137, 348/333.1, 351; 235/472.01; 358/497, 488, 358/474; 382/386
See application file for complete search history.

(56) References Cited

U.S. PATENT DOCUMENTS

| 3,848,996 | A | | 11/1974 | Goding |
| 4,244,649 | A | | 1/1981 | Rees et al. |
| 4,492,454 | A | | 1/1985 | Moser |
| 4,514,063 | A | | 4/1985 | Wang et al. |
| 4,605,971 | A | * | 8/1986 | Kimura ................ 358/483 |
| 4,622,591 | A | | 11/1986 | Katsuyama et al. |
| 4,918,476 | A | | 4/1990 | Tejima |
| 5,048,106 | A | | 9/1991 | Nakajima et al. |
| 5,059,019 | A | | 10/1991 | McCullough |
| 5,220,436 | A | * | 6/1993 | Aosaki et al. ............. 358/401 |
| 5,416,609 | A | * | 5/1995 | Matsuda et al. ........... 358/474 |
| 5,506,640 | A | | 4/1996 | Orlich |
| 5,694,632 | A | * | 12/1997 | Capper .................... 396/431 |
| 5,835,241 | A | * | 11/1998 | Saund ...................... 358/488 |
| 5,947,577 | A | * | 9/1999 | Jikihara et al. ............ 353/97 |
| 5,949,057 | A | * | 9/1999 | Feng ..................... 235/472.01 |
| 6,133,951 | A | * | 10/2000 | Miyadera ................ 348/220.1 |
| 6,218,962 | B1 | * | 4/2001 | Fiene ...................... 340/932.2 |
| 6,320,641 | B1 | * | 11/2001 | Bauer et al. ................ 355/18 |
| 6,336,587 | B1 | * | 1/2002 | He et al. ................ 235/462.45 |
| 6,385,352 | B1 | * | 5/2002 | Roustaei ................... 382/324 |
| 6,741,279 | B1 | * | 5/2004 | Allen ....................... 348/239 |
| 2001/0016084 | A1 | * | 8/2001 | Pollard et al. ............. 382/317 |
| 2003/0113034 | A1 | * | 6/2003 | Komiya et al. ............ 382/284 |

FOREIGN PATENT DOCUMENTS

| EP | 0838751 A2 | 7/1997 |
| EP | 0840200 A2 | 7/1997 |
| EP | 1022608 A1 | 1/1999 |
| GB | 2257800 A | 7/1991 |
| JP | 57104918 | 6/1982 |

* cited by examiner

Primary Examiner—Ngoc Yen Vu
Assistant Examiner—Nelson D Hernandez

(57) ABSTRACT

A framing aid for a handheld document capture device such as a digital camera, comprising two pattern generators (10,20) generating convergent patterns (14, 24) that are in register on a target object plane. Triangulation between the two pattern generators (10,20) and using superimposed or complementary patterns (14,24) ensures that the hand held device (1) is correctly arranged at a predetermined range and orientation above a document to be captured, such that the document is accurately framed within the field of view of the capture device (1).

19 Claims, 8 Drawing Sheets

FRAMING AID FOR A DOCUMENT CAPTURE DEVICE

The present invention relates in general to a framing aid for a handheld document capture device such as a digital camera, and more particularly to a framing aid using projected visible light radiation.

A document capture device such as a digital camera is provided with an optical viewfinder that must be held up to the eye when framing an image to be captured. Alternatively, an image display panel is provided, such as an LCD display, that may be angled with respect to the camera body. However, it is surprisingly difficult and time consuming to use these conventional viewfinders for document capture. In a typical document capture task it is desired to capture a document that is lying on a desk whilst the user is seated. Even with a high quality through the lens conventional viewfinder, users often fail to correctly frame the document, and often fail to view the document orthogonally thereby introducing significant perspective skew into the captured image. Further, even though a LCD display panel may be angled with respect to a viewing direction of the camera, it is surprisingly non-intuitive for the user to accurately move and position the camera by looking at the image on the LCD display panel. Hence, it is desired to provide a better framing aid for a handheld document capture device.

When a handheld device such as a digital camera is used for document capture three related factors of alignment between the device and the document should be considered:

- it is desired that the document is accurately arranged within the field of view of the device, to avoid unwanted cropping (or conversely to allow accurate cropping of unwanted portions of the document), and to maximise resolution of the captured document image;
- it is desired that the document and the device are spaced apart by a predetermined range, to allow accurate focus and;
- it is desired to minimise orientation differences between an object plane of the document and an image plane of the device, to minimise unwanted image effects such as perspective skew.

In a first aspect of the present invention an aim of at least preferred embodiments is to provide a framing aid that assists fast and accurate document capture. Another aim of at least preferred embodiments of the present invention is to provide a framing aid which addresses one or more of the three factors for alignment mentioned above, and which preferably addresses all three of these factors simultaneously. Another aim of at least preferred embodiments of the present invention is to provide a framing aid which is simple and convenient in structure and manufacture, and which is simple and convenient to use.

In a second aspect of the present invention a problem arises in that it is desired to minimise power consumption of the capture device, whilst maximising visible light output so that the projected pattern is usable even in relatively bright ambient light conditions. In the second aspect of the present invention, an aim of at least preferred embodiments is to provide a pattern generating apparatus that maximises light usage in a projected pattern.

In a third aspect of the present invention another problem arises in that it is desired to provide a framing aid which operates at different ranges. For example, a capture device having a fixed pixel resolution may be used to capture a relatively small portion of a document at a high resolution, or capture the whole document at a lower resolution, by operating the device at different ranges from the document.

In the third aspect of the present invention, an aim of at least preferred embodiments is to provide a framing aid operable at different ranges from a document.

According to a first aspect of the present invention there is provided a framing aid for use with a document capture device, comprising a first pattern generator for generating a first visible light pattern, and a second pattern generator for generating a second visible light pattern wherein the first and second visible light patterns are in register on a target object plane.

Preferably, the first and second light patterns are convergent and align on the target object plane. Preferably, the first pattern and the second pattern are completely superimposed on the target object plane. Alternatively, the first pattern and the second pattern are complementary on the target object plane. Preferably, the first pattern and the second pattern are at least partially superimposed on the target object plane and are at least partially complementary on the target object plane.

Preferably, the first pattern and the second pattern being in register on the target object plane determines both the range and orientation of the document capture device.

Preferably, at least one of the first pattern or the second pattern determines a field of view of the document capture device. Preferably, the at least one pattern explicitly determines the boundary frame. Alternatively, the at least one pattern implicitly determines the boundary frame.

Preferably, at least one of the first pattern or the second pattern is located internally of a field of view boundary frame.

According to a second aspect of the present invention there is provided a pattern generating apparatus for use in a framing aid for a document capture device, the pattern generating apparatus comprising a light source and a pattern generating element for generating an interference pattern in a light pattern projected on to a target object plane.

Preferably, the pattern generating element is a diffractive optical element. Preferably, the pattern generating element has a fan angle greater than 50° in at least one plane, more preferably at least 75° and most preferably about 90°.

According to a third aspect of the present invention there is provided a framing aid for use with a document capture device, the framing aid comprising an image sensor arranged in an image plane; a pattern generating apparatus arranged laterally offset with respect to the image sensor, the pattern generating apparatus for producing a pattern of visible light radiation on a target object plane spaced apart from the image plane of the image sensor; and adjustment means for adjusting the lateral offset between the pattern generating apparatus and the image sensor according to a range from the image plane, to the target object plane.

Preferably, a framing aid comprises a range finder for determining a range between the image plane and the target object plane, the adjustment means being responsive to the range determined by the range finder.

According to a further aspect of the present invention there is provided a method for positioning a document capture device with respect to a document, comprising the steps of generating a first visible light pattern; generating a second visible light pattern; moving the document capture device and/or the document such that the first and second visible light patterns are in register on a target object plane containing the document when the document capture device is at a predetermined position with respect to the target object plane.

Preferably, the first pattern and the second patterns are in register on the target object plane when the document capture device is at a predetermined range and orientation with respect to the target object plane.

According to another aspect of the present invention there is provided a method for positioning a document capture device with respect to a document, the document capture device including an image sensor located in an image plane, the method comprising the steps of generating a visible light pattern from a pattern generating apparatus laterally offset with respect to the image sensor, the visible light pattern being projected onto an object plane spaced apart at a range from the image plane of the image sensor; and dynamically adjusting the relative position of the pattern generating apparatus and the image sensor according to the range between the image plane and the object plane.

For a better understanding of the invention, and to show how embodiments of the same may be carried into effect, reference will now be made, by way of example, to the accompanying diagrammatic drawings in which.

Figure 1:
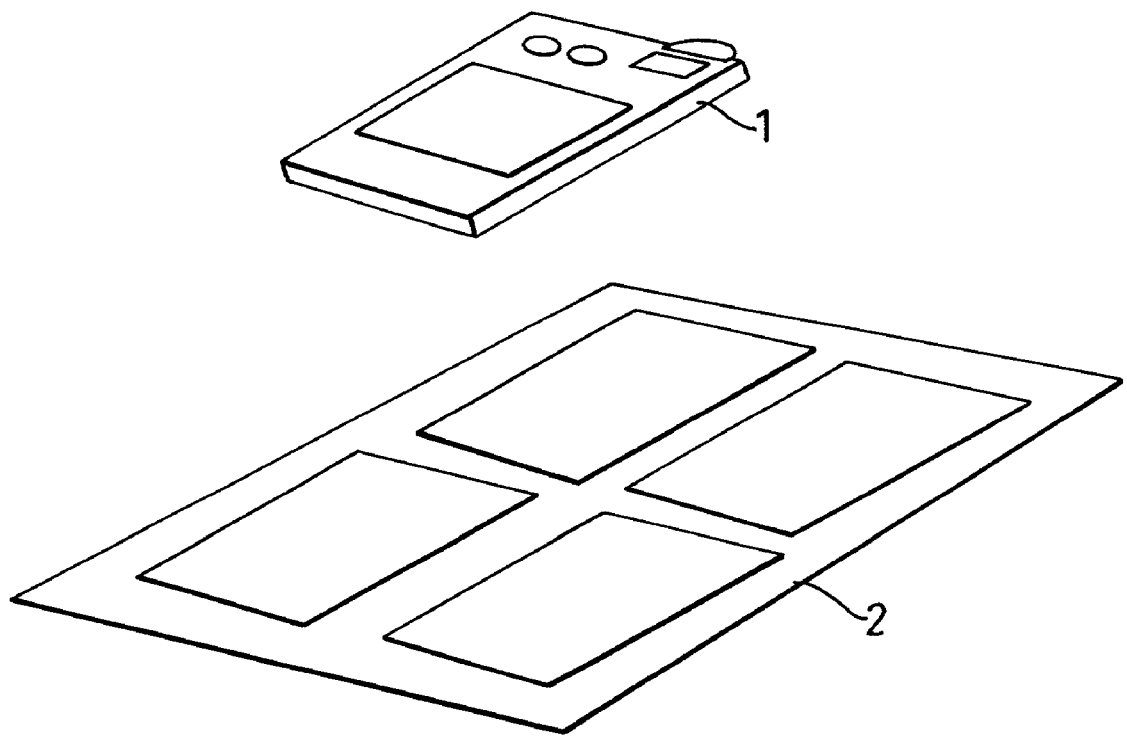
FIG. 1 is a perspective view showing a document capture device and a document.

FIG. 1 shows a document capture device 1 in an ideal position for document capture arranged directly above a document 2 lying on a flat surface such as a desk. The document 2 lies in a target object plane. Normally the document 2 is a paper media, but it will be appreciated that the document 2 may take a large variety of different forms. Document capture refers to capturing any suitable object image. For example, it may be desirable to capture an image of a piece of fabric, or a piece of wood, and both of these are within the expected use of a document capture device. The document 2 is ideally substantially planar but in practice the document is often non-planar. For example, the pages bound in a large book exhibit page curl when the book is opened. Non-planarity of the original document can be compensated after an image has been captured. In order to capture a satisfactory image it is desirable that the capture device 1 is held relatively stable, with the document within the field of view of the capture device, at a range which allows accurate focusing and exposure, and ideally at a predetermined orientation such as with an optical axis of the capture device 1 normal to the object plane of the document 2. The preferred embodiments of the present invention relate to a framing aid which will be described in more detail below.

Figure 2:
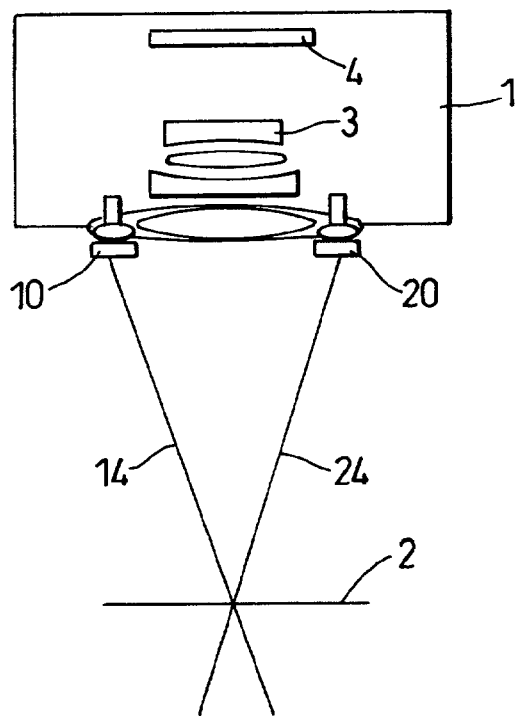
FIG. 2 is an elevation cross-section view of a capture device including a framing aid according to a preferred embodiment of the present invention.

FIG. 2 shows a document capture device 1 such as a digital camera, having image focusing optics 3 and an image sensor 4. In a digital camera the image sensor 4 is suitably a two-dimensional CCD array or CMOS array. However, the image sensor 4 may take any suitable form, including photographic film. The image sensor 4 lies in an image plane. Other elements of the capture device such as a power supply, shutter, shutter release mechanism, auxiliary lighting (flash) and user controls are not directly relevant to the present invention and need not be described in detail here.

The document capture device 1 is suitably a handheld device suitable for support and positioning by one or both hands of a user. However, a support frame (not shown) may be provided, such as a tripod or a bracket. Conveniently the support frame is arranged to rest on a support surface such as a desk, or may be supported by a suitable structure such as a nearby wall. Relative position may be adjusted by moving the document 2 or the capture device 1, or both.

As shown in FIG. 2, the document capture device 1 comprises a plurality of pattern generators 10,20 each for generating a visible light pattern 14,24 on or around a document 2 to be captured by the capture device 1.

Figure 3:
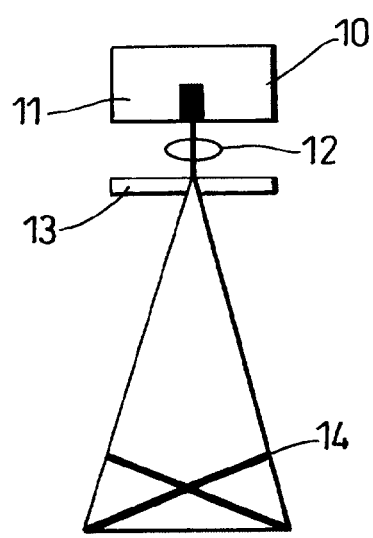
FIG. 3 is a schematic view of a preferred pattern generating apparatus.

Referring to FIG. 3, the preferred arrangement of one of the pattern generators 10 will be described in more detail. The pattern generator 10 comprises a light source 11 such as a laser diode or visible LED, and a pattern generating element 13. The pattern generating element may take any suitable form including, for example, an optical mask. Preferably, the pattern generating element 13 generates an interference pattern such that substantially all of the light received is projected as a structured light pattern. Hence, the pattern generating element maximises efficiency of the projected light. The pattern generating element is suitably a holographic optical element (HOE), preferably a diffractive optical element (DOE). Preferably, the pattern generator 10 includes collimating optics such as a collimating lens 12. The pattern generating element 13 and the light source focusing optics 12 may be combined in a single unit. In one preferred embodiment, the pattern generating element produces a pattern having a fan angle greater than 50° in at least one plane, preferably greater than 75° and ideally about 90°. Such a relatively large fan angle enables the pattern produced by the pattern generator to encompass, for example, an A4 document at a distance of around 300 mm and even as close as around 200 mm. In a preferred embodiment the pattern produced in the target object plane is suitably sized of the order of 220 mm by 330 mm. Advantageously, the pattern generating apparatus is simple and compact in construction. The preferred pattern generating element is relatively simple and inexpensive to manufacture. Although well suited for use with the framing aids discussed herein, the pattern generating apparatus is also suitable for use with other framing aids. The pattern generating apparatus may be used to generator a complete pattern, or part of a pattern. The pattern generating apparatus may be used singly, or multiply as in the preferred framing aids discussed herein.

A suitable low-cost diffractive optical element can be fabricated holographically, photolithographically, through the use of a laser pattern generator or by other means. One suitable fabrication technique is described in, for example, U.S. Pat. No. 5,218,471 (Swanson et al) "High efficiency, multi-level, diffrative optical elements". One preferred embodiment of the present invention employs a DOE manufactured by an electronic beam machine able to resolve 0.25 micrometer feature size, in order to produce a desired pattern having a relatively large fan angle. A design methodology for producing a DOE with a desired pattern is available from, for example, the following references:

"Iterative method applied to image reconstruction and to computer-generated holograms", J R Fienup, Optical Engineering, 19 (3), 1980, 297–305; and "Diffractive optical elements; iterative calculation of quantised, blazed phase structures", Frank Wyrowski, Journal of the Optical Society of America A, v7 n6, 1990, 961–969.

As shown in FIG. 3, the pattern generator 10 generates a structured light pattern 14. The second light pattern generator 20 is similar in construction to the first light pattern generator 10 shown in FIG. 3 and generates a second visible light pattern 24.

Referring again to FIG. 2, the first and second light pattern generators 10 and 20 are mounted in any suitable position relative to the capture device 1. Ideally the pattern generators 10, 20 are mounted on or within a body of the capture device 1, preferably in a laterally spaced apart relation. In the illustrated embodiment the pattern generators 10,20 are conveniently arranged either side of the image focusing optics 3.

The two pattern generators 10,20 are mounted spaced apart on the capture device 1 by a predetermined distance. The two patterns 14,24 are convergent and aligned in register on the target object plane when the capture device 1 is arranged at a predetermined range and orientation from the document 2.

Example patterns will be described below with reference to FIGS. 4–11. The two patterns may be identical such that alignment is achieved over the whole pattern in the target object plane. That is, the two patterns are superimposed and overlie one another completely. Alternatively, the two patterns may be complementary with portions of the patterns arranged to lie in a predetermined juxtaposition. For example, two complementary patterns may each include a point arranged to align with a corresponding point in the other pattern. Further, the patterns may be partially superimposed and partially complementary. The example patterns of FIGS. 4–11 are shown for illustration only and many other patterns may be used as will be apparent to the skilled person.

Figure 4:
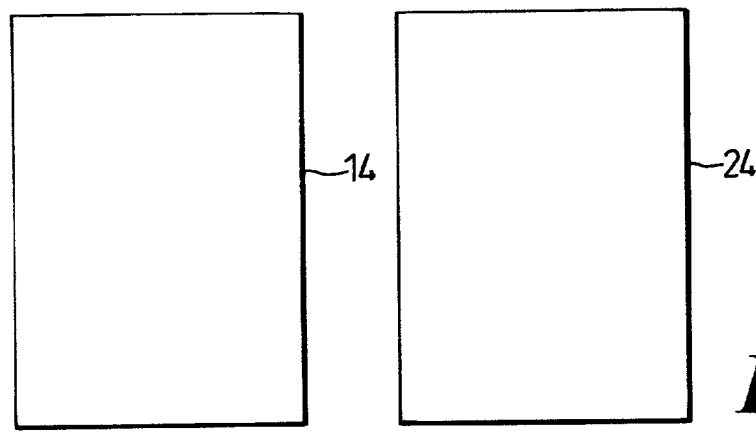
FIGS. 4–6 are schematic views illustrating example patterns generated in a first preferred embodiment.
Figure 5:
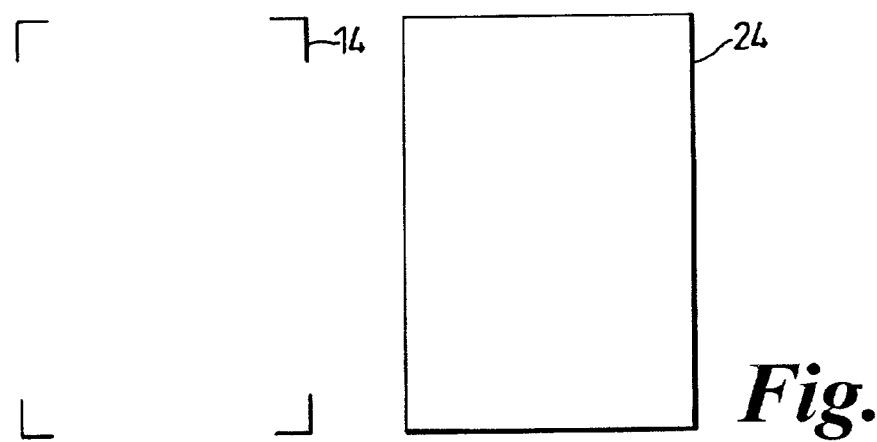
Figure 6:
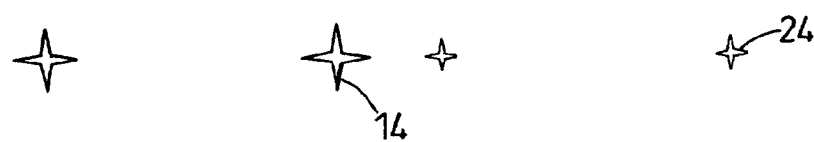
Figure 6:

It is desirable to frame the boundary of the field of view of the document capture device 1 in order to give explicit visual feedback to the user. FIGS. 4–6 illustrate a first preferred embodiment wherein the two patterns 14, 24 each explicitly determine the boundary of the field of view. Depending on the desired operating range, this may require a relatively large fan angle of over 50° up to around 90°. FIG. 4 shows a first example where both patterns form a complete box. FIG. 5 shows a second example where one of the patterns forms a complete box and the other forms four corner markers such as crosses, or alternatively L-shapes as shown. FIG. 6 shows a third example using two complementary cross patterns.

The two patterns provide the user with simple and convenient visual feedback to adjust the range between the image capture device 1 and the document 2. If the range is not correct then the two patterns will not align. Further, if the orientation of the capture device 1 is not correct, then even at the correct range one part of the patterns will not be in register. For example, if the capture device is rotated such that the optical axis is not at a predetermined orientation, such as normal to the plane of the document 2, then the patterns will be projected obliquely. The large fan angle patterns of FIGS. 4, 5 and 6 accentuate even small errors in range or orientation.

Where the document 2 is substantially planar such as a single sheet of paper lying on a desk then the first preferred embodiment works very well. Preferably, the boundary frame is arranged in use to lie just outside the document 2 and may be projected on to a supporting surface such as a desk. However, in practice the document 2 may be positioned above or below a surrounding area. This problem arises when, for example, it is desired to capture a page of a thick bound book. The boundary frame will be projected around the page and will be visible in a plane closer to and/or further away from the target object plane of the document to be captured. This problem is addressed by a second preferred embodiment that will be described with reference to FIGS. 7–9.

Figure 7:
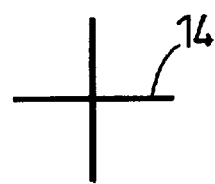
FIGS. 7–9 are schematic views illustrating example patterns generated in a second preferred embodiment.
Figure 7:
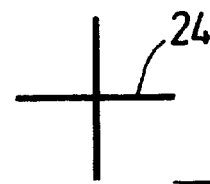
Figure 8:
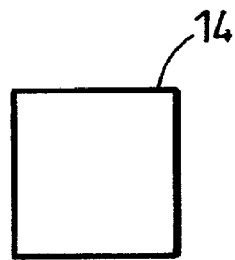
Figure 8:
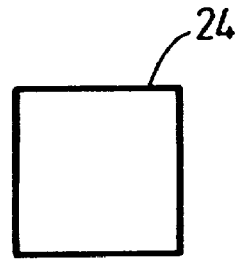
Figure 9:
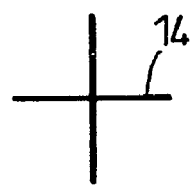
Figure 9:
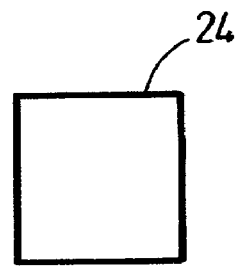

In a second preferred embodiment illustrated in FIGS. 7–9, framing of the document 2 is determined implicitly. That is, by aligning the two patterns 14, 24 over an internal portion of the document 2 the capture device 1 is known to be at a predetermined range and orientation and the document 2 will be framed to lie in the field in view of the image capture device. It has been found very convenient for users to focus on two relatively small patterns projected toward the centre of the document 2, since the visual angle is relatively small. Further, the two relatively small patterns are relatively bright and require relatively narrow fan angles to project. Surprisingly, users are able to find a centre of the document 2 with good accuracy.

The centrally projected patterns 14,24 may be completely superimposed, such as the example of a cross in FIG. 7, or a box as shown in FIG. 8. Alternatively, the patterns 14,24 may be complementary as shown in FIG. 9. In the example of FIG. 9, correct alignment is determined when the two patterns lie in a particular juxtaposition, such as with each arm of a cross pattern 14 close adjacent one side of a box pattern 24. The centrally located pattern may be chosen to assist implicit determination of the field of view. For example, the pattern, such as the box pattern 24 of FIG. 9, may be positioned parallel to each edge of a rectangular document.

Figure 10:
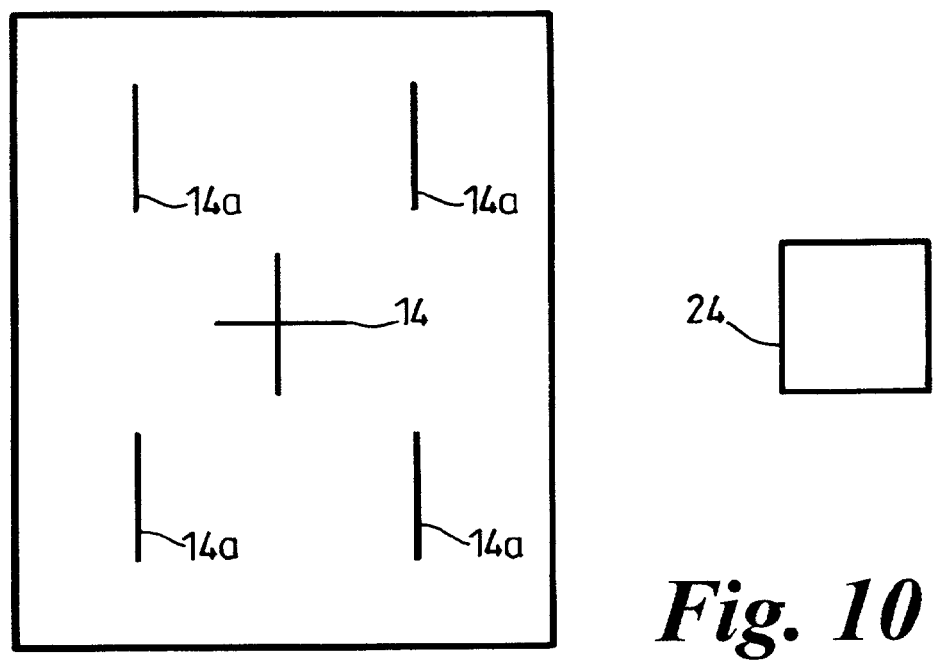
FIG. 10 is a schematic view illustrating example patterns generated in a third preferred embodiment.

In a third preferred embodiment a centrally located pattern as illustrated by FIGS. 7–9 is combined with a large fan angle pattern as illustrated by FIGS. 4–6 to combine the advantages of both approaches. As shown in FIG. 10 the first pattern 14 may comprise both a boundary marker and a centre marker, whilst the second pattern 24 comprises only a complementary centre marker.

Figure 11:
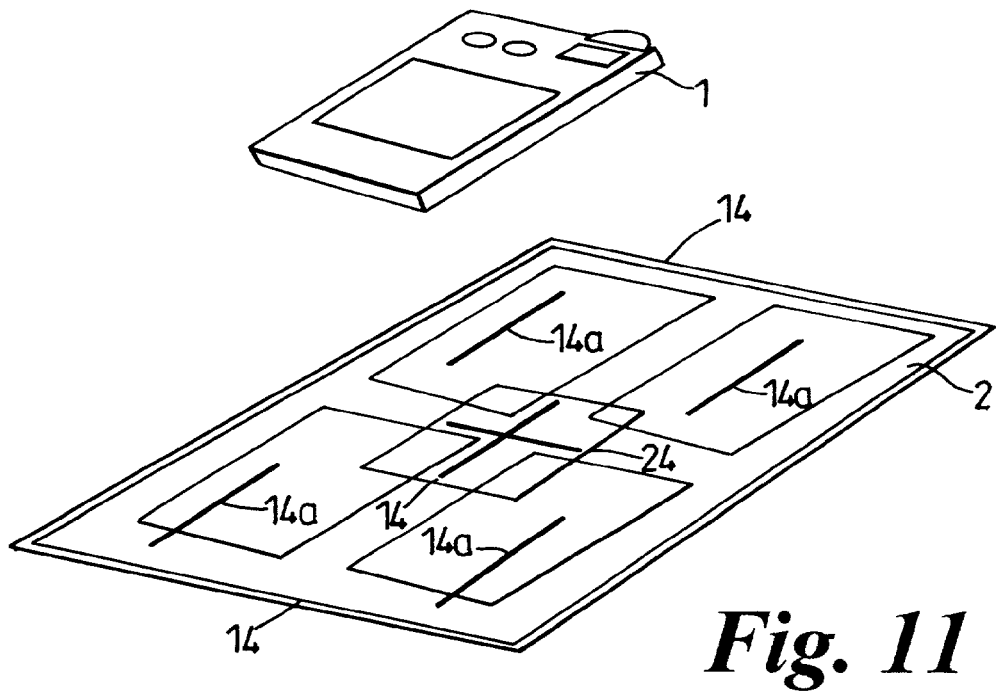
FIG. 11 is a perspective view showing example patterns of the third preferred embodiment in use.

The patterns 14,24 of FIGS. 4 to 10 are shown separately for ease of explanation. In use, the patterns are convergent and align in register in the target object plane. Referring to FIG. 11, the example patterns of FIG. 10 are shown projected by a document capture device 1 onto a document 2. In this example the document 2 is A4 sized paper media and contains text and/or images. In use the capture device 1 is held by the user in one hand, or optionally both hands such that the structured light patterns 14,24 are projected onto the document 2. The capture device 1 is moved relative to the document 2 until the projected patterns 14,24 are in register on the object plane of the document 2. This may involve adjusting the range between the capture device 1 and the document 2, or adjusting the orientation of the capture device with respect to the surface plane of the document 2, or a combination of both. Adjusting orientation includes adjusting the plane of the capture device by rotation, and movement within a plane parallel to the document 2.

Advantageously, the user may position the capture device 1 solely by looking at the projected patterns 14,24. The user may position the capture device 1 by using just hand and arm movements and with minimal whole body movement, such that the capture task may be easily accomplished while seated at a desk. It has been found that the time taken to perform the document capture task is relatively short using the framing aid described above when compared with traditional viewfinder framing methods. In practical embodiments of the invention the viewfinder may be omitted completely. This enables much greater design freedom to determine the form of the capture device.

When the user is satisfied with the position of the capture device 1, a shutter release mechanism is operated to capture an image of the document. In a preferred embodiment of the present invention a two-stage shutter release button is employed. At a first stage projection of the patterns 14,24 is activated, along with other desirable pre-image tasks such as auto-exposure and auto-focusing of the image focusing optics 3. The second stage activates capture, such as by further depressing the shutter button. The light patterns may be turned off during document capture, and may be reimposed immediately after capture so that the user may visually confirm that the document capture task has been completed successfully.

As well as providing visual feedback for the user, the visible light pattern may include elements which aid post image capture processing. For example, in order to compensate for non-planarity of the document such as page curl, image markers may be provided as reference points, such as the straight lines 14a shown in FIG. 10. The actual document image surface may then be determined relatively accurately. Preferred embodiments of the present invention employ image compensating methods able to determine the plane of the original document captured in the image to within about one degree. Information about the document surface is very useful in compensating the captured image. Here, two images may be captured in quick succession; one with reference points and one without, such that information determined from the first image with reference points may be used to compensate the clean second image showing only the document captured.

In the preferred embodiments discussed above, the light patterns are used so that the user may move the document capture device to one fixed position with respect to the document. Conveniently, the capture device may have a fixed focus allowing a relatively simple construction.

In other preferred embodiments, the document capture device 1 is operable at a plurality of predetermined positions. A plurality of predetermined ranges may be selected such that the field of view is appropriate to, for example, documents sized A5, or sized A4, or sized A3. Adjusting the range allows the field of view to remain fixed giving a simple construction and, assuming the image sensor has a fixed pixel resolution, larger documents will be captured at a lower resolution than smaller documents.

As discussed above, the light patterns produced by the light pattern generators 10,20 are directed to converge and align in register on the target object plane of the document 2. In one embodiment the light patterns are produced such that respective portions of the patterns are aligned in register at each predetermined position. That is, a first portion of each pattern will align in register for a document sized A5, whilst a second portion of each pattern will align in register for a document sized A4. The user may then concentrate on only those portions of the patterns relevant to the size of document to be captured. Other portions of the patterns will be out of register and may be ignored. However, the patterns so produced tend to be visually cluttered. Hence, in a second embodiment each pattern generator 10,20 is moveably mounted on a support (not shown), such that the pattern generator may be moved to one of a plurality of predetermined configurations according to each of the plurality of predetermined positions of the capture device 1 relevant to the document 2. Suitably, each pattern generating apparatus 10,20 is mounted on a rotatable support, such as a spindle, such that the apparatus is moveable to a plurality of predetermined angular configurations. In one preferred embodiment the pattern generating apparatus 10,20 are linked electrically or mechanically and move in concert such that the generated light patterns 14,24 converge and align in register on the target object plane for each of the predetermined positions. It is desirable that the document capture device includes a variable focus mechanism to adjust the image focusing optics 3 appropriate to a selected one of the plurality of predetermined positions. In one embodiment the desired position is selected manually by the user, such as by setting a control to, for example, "A4" or "A3". In another preferred embodiment an autofocus mechanism is employed. Further, the autofocus mechanism may be used to determine an approximate range between the capture device 1 and the document 2. The pattern generating apparatus 10,20 are coupled to move to a configuration appropriate to the range determined by the autofocus mechanism, with the user then making relatively minor adjustments to correct the document capture device to the predetermined position. Hence, when the user moves the document capture device to a significantly different range, the pattern generating apparatus 10,20 and the focusing optics 3 are both adjusted accordingly.

In the example embodiment illustrated in FIG. 2, the pattern generating apparatus 10,20 are laterally offset with respect to the image focusing optics 3 and the image sensor 4. Hence, there is a parallax error between each of the image generating apparatus 10,20 and the optical components of the document capture device due to this lateral offset. In the embodiment described above where the capture device is to be positioned in one fixed position or one of a plurality of fixed positions, parallax error is corrected by appropriate positioning of the pattern generating apparatus 10,20 and/or by producing appropriate corrections in the patterns 14,24. In a further embodiment of the present invention it is desirable to allow the user to position the document capture device 1 at any suitable position over the document 2. That is, in this embodiment of the invention it is desirable that the user may continuously vary the range between the capture device 1 and the document 2. This embodiment is particularly suited for use with a framing aid projecting a single pattern, such as a single boundary frame, which may be produced using only one pattern generating apparatus 10.

Figure 12:
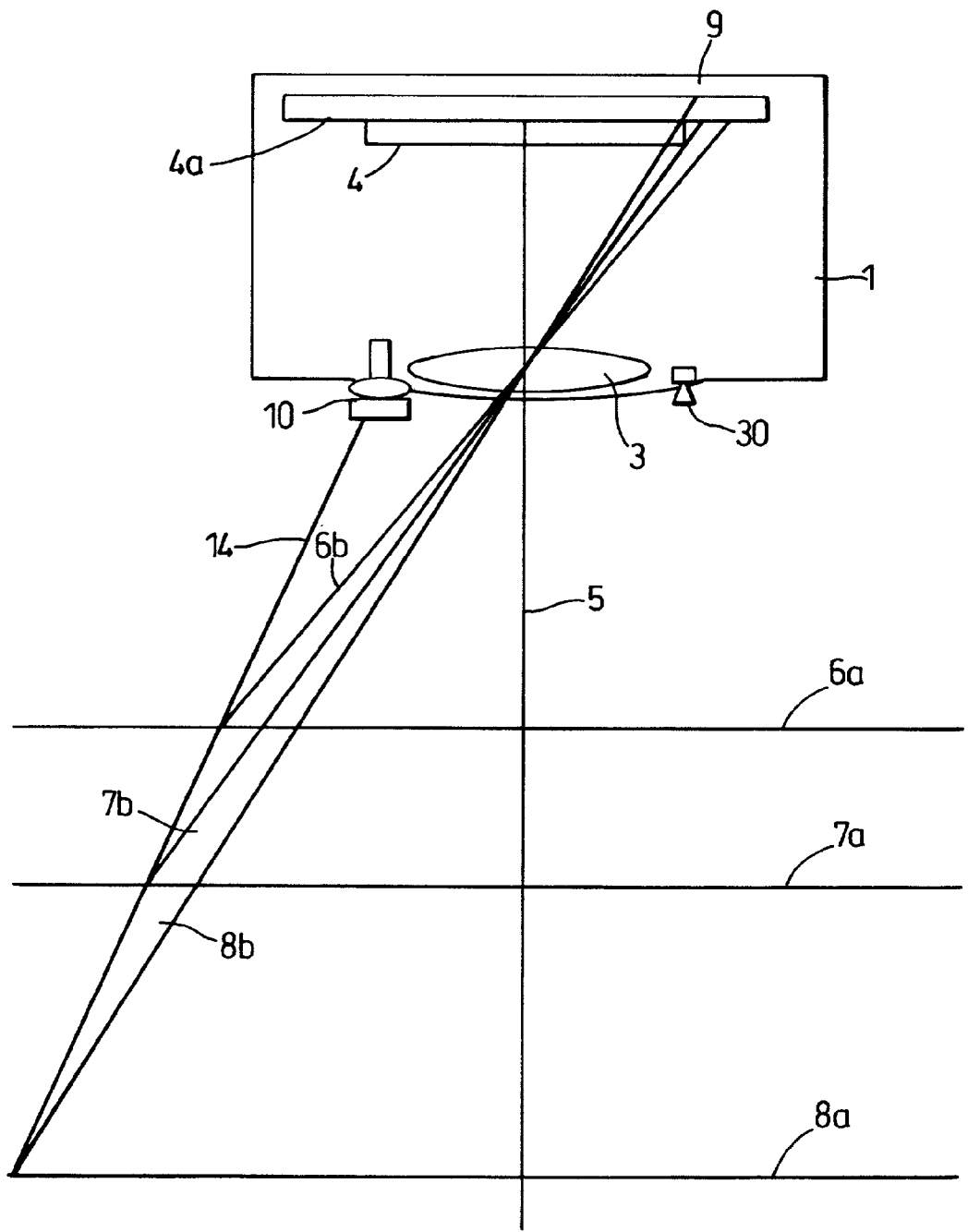
FIGS. 12–14 are schematic views illustrating operation of another preferred embodiment of a framing aid.

Referring to FIG. 12, a document capture device 1 is shown with focusing optics 3 having an optical axis 5 normal to an image sensor 4 mounted at an image plane 4a. Three example ideal target object planes 6a, 7a & 8a are shown at various ranges from the image plane 4a. For simplicity, the optical axis 5 is normal to each of the target object planes 6a, 7a & 8a, such that the image plane is parallel to the object plane. A pattern generator 10 generates a pattern diverging at a predetermined fan angle to produce a light pattern on the target object. For simplicity one edge of the pattern 14 is illustrated. Light reflected from the corresponding object plane is returned to the image plane 4a through the focusing optics 3. Here, example beams 6b, 7b and 8b are illustrated.

FIG. 12 shows the apparatus in a first position wherein the capture device 1 is configured for use at a predetermined range appropriate to the first object plane 6a, such that the reflected beam 6b reaches the edge of the image sensor 4 on the image plane 4a. Beams reflected from an object plane at a greater range, such as the example object planes 7a and 8a, fall outside the image sensor 4.

Figure 13:
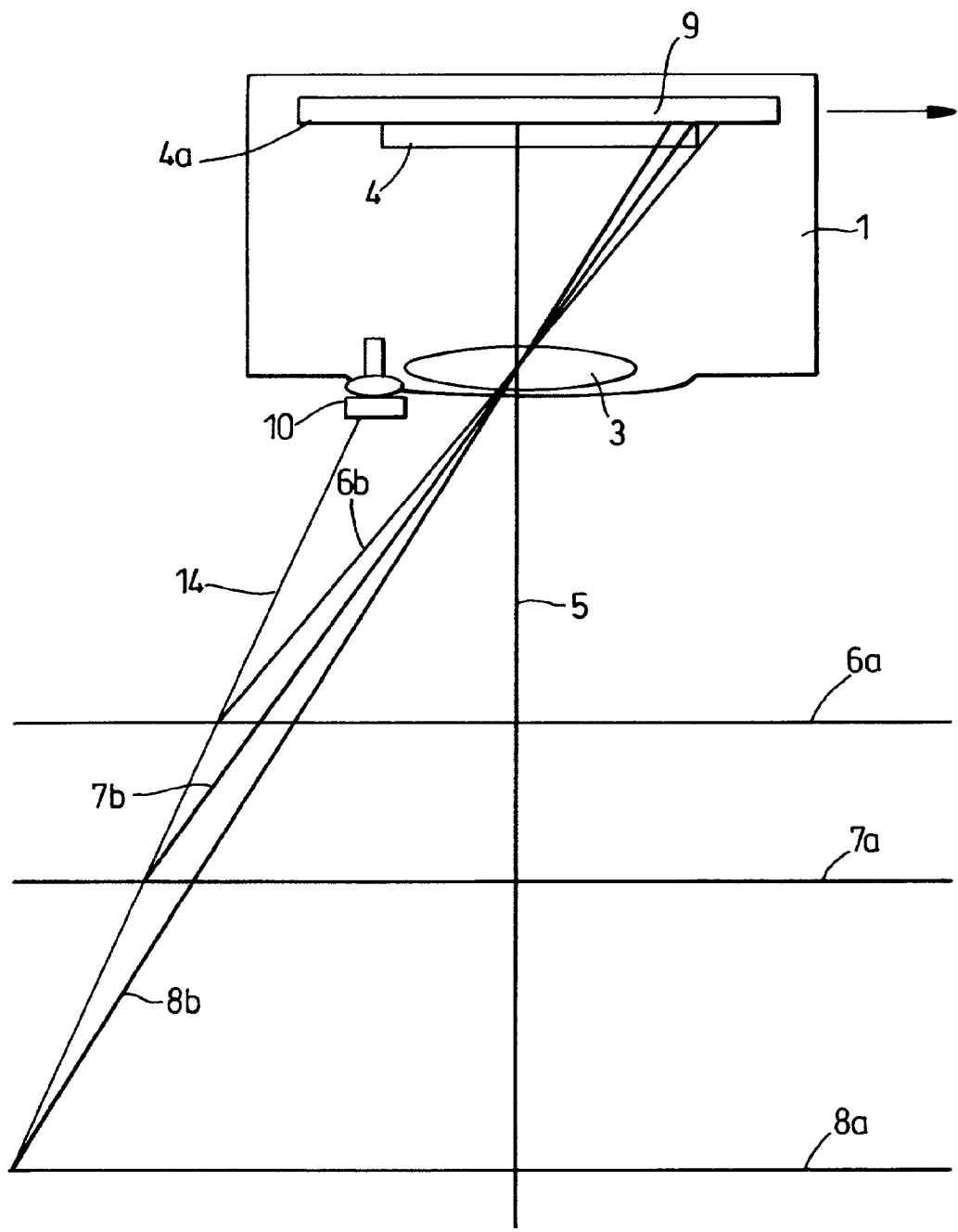

As shown in FIG. 13, where it is desired to configure the capture device 1 for use with an object plane 7a at a greater range than the object plane 6a then the image sensor 4 is moved with respect to the focusing optics 3 and the pattern generator 10. In this example, the image sensor 4 is moved laterally in the image plane 4a. Alternatively, the image sensor 4 may be rotated, ideally about an axis normal to the image plane 4a. The image sensor 4 is moved in order to dynamically adjust for the parallax error between the sensor 4 and the pattern generator 10.

Figure 14:
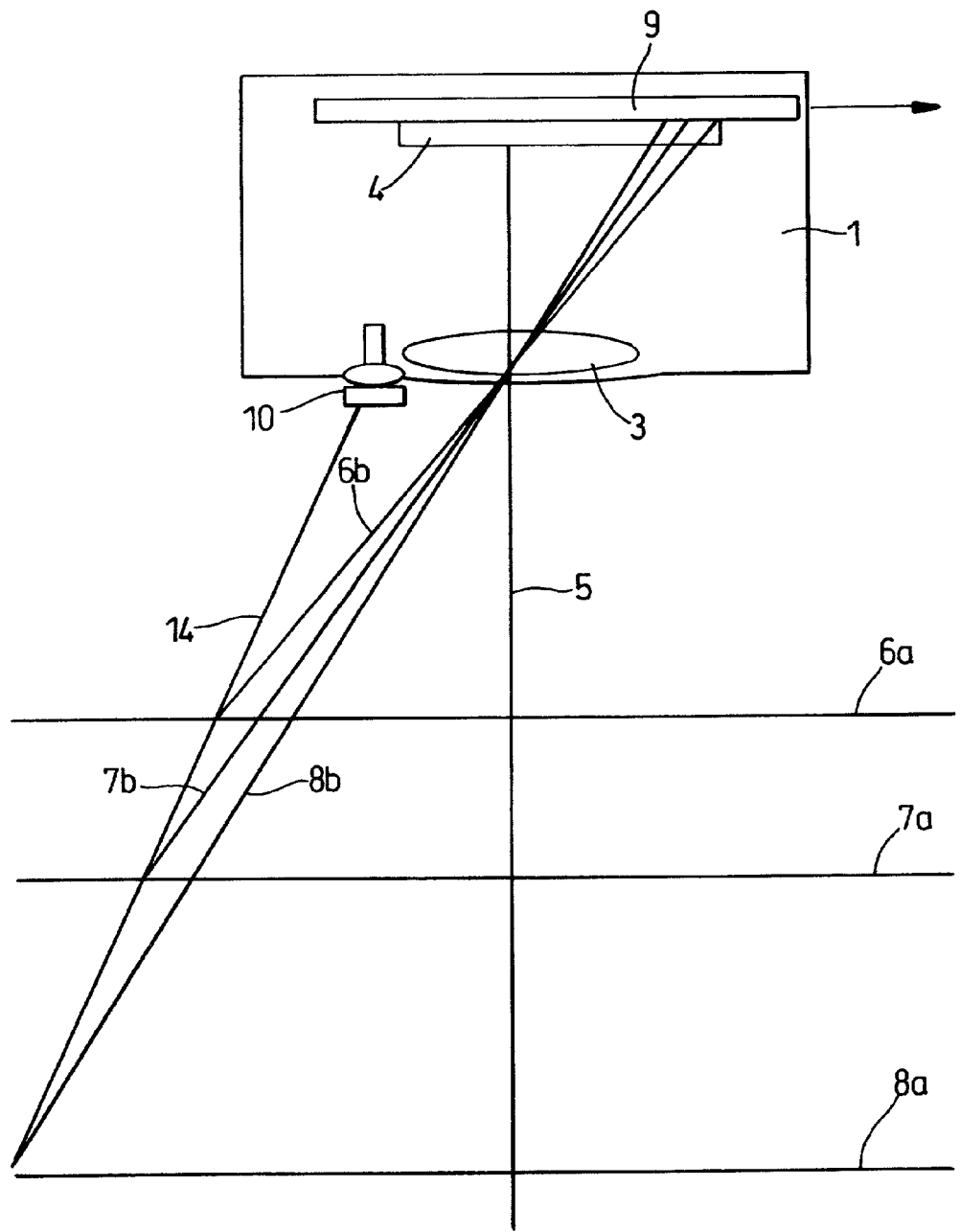

FIG. 14 shows a third example configuration where the capture device 1 is arranged for use at a range appropriate to the third object plane 8a. This requires a further movement, in this case a lateral shift, of the image sensor 4 with respect to the optics 3 and the pattern generator 10.

In the preferred embodiment, the image sensor 4 is carried on a moveable structure 9 dynamically coupled to a focus mechanism of the capture device 1. An autofocus mechanism (not shown) may be provided to adjust the focus optics 3 based on a range to the target object plane determined by a pre-capture range finder function 30. The moveable structure 9 may be coupled to move in response to movement of the autofocus mechanism. In other preferred embodiments the light projector 10 or the focus optics 3 move with respect to the sensor 4.

A framing aid for use with a handheld document capture device has been described which allows range and orientation of the device to be determined quickly and accurately by the user. Framing the field of the view of the device may be performed quickly and accurately either directly or indirectly. Also, a pattern generating apparatus has been described which uses simple and cost effective components to produce a bright structured light pattern optionally over a relatively large fan angle. Further, a framing aid has been described that is operable at varying ranges, including a plurality of fixed positions. Further still, a framing aid has been described that is adjustable to correct for parallax error over a continuously variable range.

Whilst preferred embodiments of the present invention have been described above, changes and modifications will be apparent to the skilled person and fall within the scope of the invention as defined by the following claims.

The invention claimed is:

1. A method of capturing an object image of a document comprising placing the document on a flat horizontal surface, stably holding an image captive device relative to the document while the document is on the flat horizontal surface so the object image is in a field of view of an image sensor of the image capture device, projecting onto the document a plurality of structured optical patterns from the stably held image capture device while the document is on the flat horizontal surface so the patterns are aligned in register on the document, framing the object image in the field of view of the image sensor by adjusting the relative positions of the image sensor and the document on the flat horizontal surface, the position adjustment being performed by responding to the structured optical projected images and then capturing, with the sensor, the object image on the document while the object image is framed, wherein the object image capturing step includes capturing first and second object images having different first and second predetermined areas, positioning the image sensor at first and second different ranges while the first and second object images are respectively captured so the field of view of the image sensor remains fixed during capturing of the first and second object images, the image sensor being positioned at the first and second ranges by performing, at the first and second ranges, the holding, projecting and framing steps.

2. A method according to claim 1, wherein the relative position of the image sensor and the document is adjusted by adjusting the range between the image sensor and the document.

3. A method according to claim 1, wherein the image sensor is positioned relative to the document by adjusting the position of the image capture device relative to the document.

4. A method according to claim 1, wherein the image sensor is positioned relative to the document by adjusting the lateral position of the image sensor relative to the pattern generators while the image capture device is maintained at a fixed range from the object image.

5. A method according to claim 1, wherein at least one of the patterns forms an image for surrounding the object image while the object image is framed.

6. A method according to claim 1, wherein the relative position of the image sensor and the document is adjusted by adjusting the orientation between the image sensor and the document.

7. A method according to claim 6, wherein the orientation is adjusted by rotating the plane of the image captive capture device and moving the image captive device in a plane parallel to the document.

8. A method according to claim 1, wherein the relative position of the image sensor and the document is adjusted by adjusting the range and orientation between the image sensor and the document.

9. A method according to claim 1, wherein the plural patterns on the document together are aligned and occupy a relatively small area of the object image in the vicinity of the center of the document when the object image is framed.

10. A method according to claim 1, wherein the plural patterns (a) form an image that surrounds the object image and (b) are aligned when the object image is framed.

11. A method according to claim 1, wherein the patterns are not projected onto the document while the image sensor is capturing the object image.

12. A method according to claim 1, further including projecting, onto the document, image markers that function as reference points, and using the image markers to (a) determine non-planarity of the document and (b) compensate for the non-planarity during reproduction of the captured object image.

13. A method according to claim 12, wherein first and second images of the object image are captured by the image sensor at different times while the object image remains in situ, the first captured image including the image markers and the object image, the second captured image including only the object image, and compensating for the non-planarity of the second captured image by using the image markers on the first captured image.

14. A method according to claim 13, wherein the image markers include straight lines.

15. A method according to claim 1, wherein a first set of the plural patterns is projected onto a document, including the first object image, while the first object image is framed, and a second set of plural patterns is projected onto a document, including the second object image, while the second object image is framed, the first object image being framed in response to the first set of plural projected patterns being aligned in register on the document including the first object image, and the second object image being framed in response to the second set of plural projected patterns being aligned in register on the document including the second object image.

16. A method according to claim 15, wherein only the first set of the plural patterns is projected onto the document while the first object image is framed, and only the second set of the plural patterns is projected onto the document while the second object image is frame.

17. A method according to claim 15, further including correcting parallax errors between the image sensor and the first and second sets of plural patterns projected on the document by moving the image sensor relative to the sources.

18. A method according to claim 17, wherein the movement of the image sensor relative to the sources is lateral movement in a plane at right angles to an image plane of the image sensor.

19. A method according to claim 17, wherein the movement of the image sensor relative to the sources is rotational movement in a plane at right angles to an image plane of the image sensor.

* * * * *